(12) United States Patent
Vom Stein et al.

(10) Patent No.: US 8,485,926 B2
(45) Date of Patent: Jul. 16, 2013

(54) SEALING ARRANGEMENT AND LINK OF A CHAIN WITH SAID SEALING ARRANGEMENT

(75) Inventors: Hans-Joachim Vom Stein, Odenthal (DE); Wolfgang Korte, Köln (DE); Marcus Stojek, Much (DE)

(73) Assignee: AB SKF, Gothenburg (SE)

( * ) Notice: Subject to any disclaimer, the term of this patent is extended or adjusted under 35 U.S.C. 154(b) by 1145 days.

(21) Appl. No.: 11/631,359

(22) PCT Filed: Jun. 27, 2005

(86) PCT No.: PCT/EP2005/006882
§ 371 (c)(1), (2), (4) Date: Jun. 4, 2007

(87) PCT Pub. No.: WO2006/002845
PCT Pub. Date: Jan. 12, 2006

(65) Prior Publication Data
US 2007/0267821 A1      Nov. 22, 2007

(30) Foreign Application Priority Data

Jun. 30, 2004   (DE) .......................... 10 2004 031 941

(51) Int. Cl.
*F16G 13/02*   (2006.01)
*B62D 55/00*   (2006.01)
*B62D 55/08*   (2006.01)
*F16F 1/34*    (2006.01)
*E05F 1/08*    (2006.01)
*F16J 15/34*   (2006.01)
*F16J 15/32*   (2006.01)

(52) U.S. Cl.
USPC ........... 474/206; 277/384; 277/573; 277/549; 277/381; 305/103; 305/104

(58) Field of Classification Search
USPC .................. 277/384, 573, 549, 381; 305/103, 305/104; 474/205, 206
See application file for complete search history.

(56) References Cited

U.S. PATENT DOCUMENTS 2,736,584 A * 2/1956 Riesing .......................... 277/573
3,218,107 A * 11/1965 Reinsma ....................... 305/104
(Continued)

FOREIGN PATENT DOCUMENTS

CN    14671122       1/2004
DE    27 26 033 A1   12/1977
(Continued)

OTHER PUBLICATIONS

International Search Report.
(Continued)

*Primary Examiner* — William A Rivera
*Assistant Examiner* — Henry Liu
(74) *Attorney, Agent, or Firm* — Buchanan Ingersoll & Rooney P.C.

(57) ABSTRACT

A sealing arrangement used to create a seal between a first (12) part of a chain and a second (14) part of a chain, wherein said second part can at least be pivoted in relation to the first part, exhibiting the following features: a sealing ring (40) with an annular sealing lip (42) for sealing a lubricant area between parts which can be pivoted towards each other, an elastic ring (60) which can be fixed to one of the parts and which can be used to exert pressure on the sealing ring; in addition to a supporting ring (50) which is arranged between the sealing ring and the elastic ring; and link of a chain provided with said sealing arrangement.

4 Claims, 1 Drawing Sheet

U.S. PATENT DOCUMENTS

| | | | | |
|---|---|---|---|---|
| 3,614,113 | A * | 10/1971 | Burk | 277/384 |
| 3,841,718 | A * | 10/1974 | Reinsma | 305/103 |
| 4,089,531 | A * | 5/1978 | Roley et al. | 305/103 |
| 4,094,516 | A * | 6/1978 | Morley et al. | 305/103 |
| 4,132,418 | A * | 1/1979 | Roli | 277/382 |
| 4,195,852 | A * | 4/1980 | Roley et al. | 277/380 |
| 4,209,204 | A * | 6/1980 | Wagner et al. | 305/103 |
| 4,240,642 | A * | 12/1980 | Roussin | 305/103 |
| 4,248,439 | A * | 2/1981 | Haslett | 277/380 |
| 4,262,914 | A * | 4/1981 | Roley | 277/381 |
| 4,274,682 | A * | 6/1981 | Livesay | 305/103 |
| 4,275,890 | A * | 6/1981 | Reinsma | 277/384 |
| 4,284,281 | A * | 8/1981 | Reinsma | 277/384 |
| 4,331,339 | A * | 5/1982 | Reinsma | 305/103 |
| 4,364,572 | A * | 12/1982 | Yamamoto et al. | 277/380 |
| 4,392,657 | A * | 7/1983 | Roley | 277/383 |
| 4,457,521 | A * | 7/1984 | Morley | 305/103 |
| 4,469,336 | A * | 9/1984 | Linne | 277/402 |
| 4,504,066 | A * | 3/1985 | Horl | 277/399 |
| 4,607,854 | A * | 8/1986 | Bissi et al. | 277/402 |
| 4,688,805 | A * | 8/1987 | Crotti et al. | 277/381 |
| H1180 | H * | 5/1993 | Arianoutsos et al. | 277/381 |
| 5,390,997 | A * | 2/1995 | Nakaishi et al. | 305/103 |
| 5,763,956 | A * | 6/1998 | Metz et al. | 305/102 |
| 5,794,940 | A * | 8/1998 | Brueggmann | 277/364 |
| 6,322,082 | B1 * | 11/2001 | Paykin | 277/549 |
| 6,783,129 | B2 * | 8/2004 | Akita et al. | 277/349 |
| 6,955,359 | B2 * | 10/2005 | Yamamoto et al. | 277/565 |
| 7,121,555 | B2 * | 10/2006 | Yamamoto et al. | 277/565 |
| 7,367,739 | B2 * | 5/2008 | Brock et al. | 403/39 |

FOREIGN PATENT DOCUMENTS

| | | |
|---|---|---|
| DE | 28 08 658 C2 | 2/1983 |
| DE | 27 26 033 C2 | 1/1987 |
| DE | 28 37 640 C2 | 10/1991 |
| GB | 1 408 517 A | 10/1975 |
| WO | WO 01/13015 A1 | 2/2001 |

OTHER PUBLICATIONS

Office Action issued on Mar. 1, 2013 by Chinese Patent Office in corresponding Chinese Patent Application No. 201110261219, and English translation thereof.

* cited by examiner

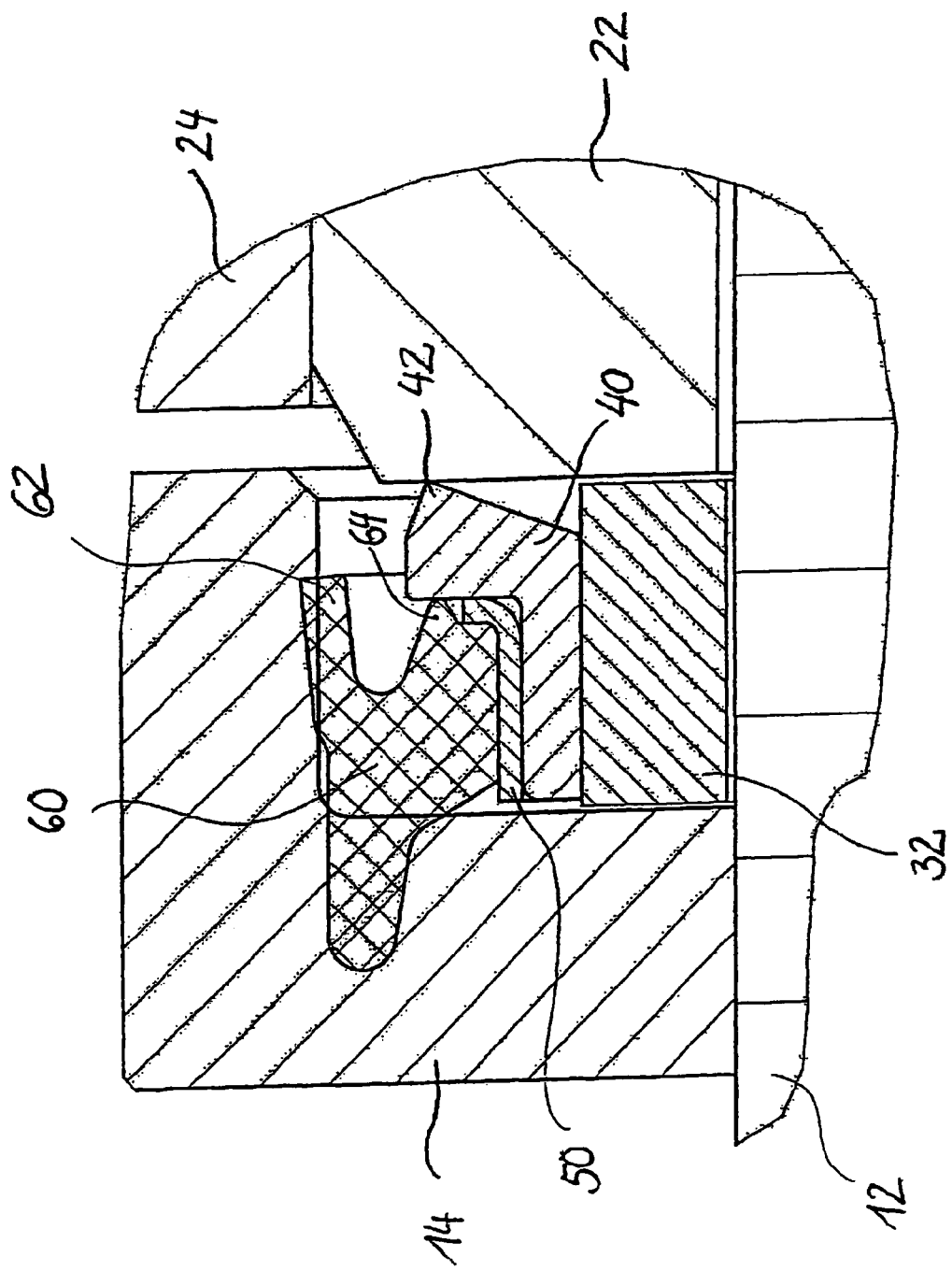

SEALING ARRANGEMENT AND LINK OF A CHAIN WITH SAID SEALING ARRANGEMENT

TECHNICAL FIELD

The invention relates to a seal arrangement for sealing between a first part of a chain and a second part of a chain which can be at least pivoted relative to the first and the hinge of a chain with the seal arrangement.

BACKGROUND DISCUSSION

In chains especially of chained vehicles, ordinarily the links of the chain are interconnected via pivot hinges. In this connection this pivot hinge comprises a pin and a sleeve which is pushed with a swivelling capacity over the pin, with the links of the chain being pressed on the ends of the pin and the sleeve. The rotary bearing surfaces between the pin and the sleeve are lubricated by an oil chamber in the pin, the oil space between the pin and sleeve being sealed by two seal elements which comprises sealing lips which press against the front surfaces of the sleeve.

For example, DE 27 26 033 A1 discloses a chain pin arrangement with a seal, the chain pin arrangement comprising a chain pin with a part of a first chain link attached to the chain pin and a sleeve which can be moved back and forth relative to the pin and which surrounds one part of the chain pin, with a part of a second chain link attached to the sleeve. Furthermore the chain pin arrangement comprises a hollow made in the first chain link for holding the seal which is provided with its sealing lip for adjoining the front side of the sleeve, and a spacer ring which surrounds the chain pin, which extends in the axial direction between the front surface of the hollow and the front surface of the sleeve and its outer peripheral surface together with the front surface of the sleeve and the hollow forms a cavity for holding the seal. In this connection, the seal which has been inserted into the cavity comprises a main sealing ring of comparatively stiff, but elastic first elastomer material and an auxiliary seal element of a second elastic elastomer material which is much less stiff than the first material.

U.S. Pat. No. 4,607,854 discloses a seal arrangement for a chain pivot hinge in which there are a first ring of flexible elastomer material having a sleeve-like part and a flange-like part with a sealing lip, and a second sleeve which surrounds the first touching ring of elastic material for sealing the space between the pin and the sleeve surrounding the pin. Here the first ring comprises a cylindrical, metallic stiffening ring which is embedded completely in the sleeve-like part of the first ring.

The object of the invention is to devise a seal arrangement for sealing between the first part of the chain and a second part of the chain which can be at least pivoted relative to the first, and which has especially a long service life.

A seal arrangement for sealing between the first part of the chain and a second part of the chain which can be at least pivoted relative to the first contains the following features:
- a sealing ring with an annular sealing lip for sealing the lubricant space between the parts which can be pivoted against one another,
- an elastic ring for securely adjoining one of the parts and for applying pressure to the sealing ring and
- a support ring located between the sealing ring and the elastic ring.

The invention is based on the finding that for a conventional seal arrangement in which the elastic ring interacts directly with the sealing ring, the elastic ring when installed is deformed as intended such that it produces forces both in the axial and also radial direction, the radially acting forces after a certain time causing the sealing ring to be pressed by creep effects onto the cylindrical jacket-like opposing surface on the pin or spacer ring, so that the seal arrangement becomes immovable and can no longer equalize the axial tolerances; this ultimately causes leaks. Another contributing effect is the deformation of the sealing ring which forms upon axial movements of the pin or spacer ring as a result of the radially acting forces in conjunction with the friction of the sealing ring on the pin or spacer ring. The invention avoids the aforementioned adverse effects by inserting between the sealing ring and elastic ring a support ring with which the high radial forces are captured.

Because the support ring is simply placed between the sealing ring and the elastic ring during installation, the entire seal arrangement can be easily and thus economically produced. The seal arrangement achieves a much longer service life compared to comparable conventional seal arrangements at production costs which are roughly the same or even lower.

In one advantageous embodiment the support ring, the elastic ring, and the sealing ring are made matched to one another such that the elastic ring together with the sealing ring seals the support ring to the outside. This advantageously prevents penetration of moisture from the outside to the support ring so that the support ring especially when made as a metal ring is protected from corrosion.

In one advantageous configuration the elastic ring is made to form an annular sealing lip which upon proper deformation of the elastic ring when viewed from the outside is designed to adjoin one of the parts of the chain in front of the sealing lip of the sealing ring. This advantageously prevents penetration of dirt from the outside in the direction of the sealing lip of the sealing ring.

Other advantages, features and details of the invention will become apparent from the embodiment of the invention described below using the FIGURE.

BRIEF DESCRIPTION OF THE DRAWING FIGURE

The drawing FIGURE is a longitudinal cross-sectional view of a seal arrangement for sealing between a first part of a chain and a second part of the chain which can be at least pivoted relative to the first.

DETAILED DESCRIPTION

The drawing FIGURE shows as one embodiment of the invention a longitudinal section through a seal arrangement for sealing between a first part of a chain and a second part of the chain which can be at least pivoted relative to the first. The drawing FIGURE shows simply by way of extract the top, leftmost region of the longitudinal section, the right region which is not shown being made as a minor image of the illustrated region with respect to the vertical axis.

The first part of the chain comprises a pin 12 and an outer chain link 14 which is pressed on the pin 12 with its cylindrical holes. The second part of the chain comprises a sleeve 22 which can be at least pivoted against the pin 12 and which has been pushed over the pin 12 with radial play, and an inner chain link 24 which is pressed on the sleeve 22 with its cylindrical holes. Furthermore, with axial play between the outer chain link 14 and the sleeve 22 there is a spacer ring 32 pushed over the pin 12 with radial play.

A sealing ring 40 is pushed over the spacer ring 32 and is made to seal the oil-filled space extending essentially between the outer surface of the pin 12 and the inside surface of the sleeve 22, forming a sealing lip 42 which properly seals against the front surface of the sleeve 22. Furthermore the sealing ring 40 lies against the outside surface of the spacer ring 32 over a large area and is made to form essentially L-shaped cross sectional surfaces. In the direction to the outer chain link 14, a correspondingly inserted support ring 50 is connected to the sealing ring 40. The support ring is metal and is likewise made to form essentially L-shaped cross sectional surfaces. Finally an elastic ring 60 which in the undeformed state forms essentially Y-shaped cross sectional surfaces is inserted following the support ring 50.

The sealing ring 40 here comprises an elastomer material, especially polyurethane, and can be made fiber-reinforced. The elastic ring 60 likewise comprises an elastomer material, especially rubber, and is less stiff than the sealing ring 40. The metal support ring 50 is much stiffer than the sealing ring 40 and the elastic ring 60 and includes an axially extending section 50a disposed radially between radially facing surfaces 40a and 60a of the respective sealing ring and the elastic ring, to space those surfaces apart from one another.

The radially outer branch of the Y-shape of the elastic ring 60 pointing axially to the inside forms a sealing lip 62 which is in front of the sealing lip 42 of the sealing ring 40 viewed from the outside and which is designed to adjoin the front surface of the sleeve 22 with proper deformation of the elastic ring 60.

In order to stop corrosion of the metal support ring 50 by moisture penetrating from the outside, the support ring 50, the elastic ring 60 and the sealing ring 40 are matched to one another such that the support ring 50 in the base area of the L-shape extends radially less far to the outside than the sealing ring 40, and the elastic ring 60 forms a further annular sealing lip 64 which projects in the axial direction and which is designed to seal against the front surface of the sealing ring 40 in order to thus seal the support ring 50 against effects from the outside.

In the drawing FIGURE, the first and second parts of the chain and the spacer ring 32 are properly mounted, conversely especially the elastic ring 60 but also the sealing ring 40 are shown in a still undeformed state which arises before the two parts of the chain are pushed together. When the two parts of the chains are properly mounted, as shown in the drawing FIGURE, the elastic ring 60 is strongly deformed, by which the elastic ring 60 rests tightly against the outer chain link 14, but at the same time via the support ring 50 presses the sealing ring 40 with its inner surface against the outer surface of the spacer ring 32 and the sealing lip 42 against the front surface of the sleeve 22. Furthermore, in this way the sealing lip 62 of the elastic ring 60 is pressed against the front surface of the sleeve 22 and the other sealing lip 64 of the elastic ring 60 is pressed against the sealing ring 40.

The invention claimed is:

1. A chain assembly and seal arrangement comprising:
   a first chain part;
   a second chain part which is at least pivotable relative to the first chain part about an axis and forming together with the first chain part a lubrication space containing a lubricant;
   an L-shaped sealing ring positioned between the first and second chain parts, the sealing ring comprising an axially extending section oriented generally parallel to the axis and a radially extending annular sealing lip that seals the lubricant space between the first and second chain parts;
   an elastic ring securely adjoining the first chain part or the second chain part and applying pressure to the sealing ring, the elastic ring including an axially extending section oriented generally parallel to the axis and disposed radially outwardly of, and facing radially toward, the axially extending section of the sealing ring;
   a support ring including an axially extending section stiffer than both the sealing ring and the elastic ring and located radially between the axially extending sections of the sealing ring and the elastic ring, respectively, to space such axially extending sections radially from one another; and
   the elastic ring comprising a sealing lip contacting the radially extending section of the sealing ring at a location radially outwardly of a radially extending section of the support ring.

2. The chain assembly and seal arrangement according to claim 1, wherein the lubricant comprises oil.

3. The chain assembly and seal arrangement according to claim 1, wherein the contact of the sealing lip of the elastic ring with the radially extending section of the sealing ring is the only contact between the elastic ring and the sealing ring.

4. A seal arrangement providing a seal between a first part of a chain and a second part of the chain which is at least pivotable relative to the first part of the chain about an axis, comprising:
   a sealing ring positioned between the first and second parts, the sealing ring comprising an annular sealing lip for sealing a lubricant space between the first part and the second part which is at least pivotable relative to the first part, the sealing ring including a radially outwardly facing surface;
   an elastic ring securely adjoining the first part or the second part and applying pressure to the sealing ring, the elastic ring including a radially inwardly facing surface facing radially toward the radially outwardly facing surface; and
   a support ring including an axially extending section stiffer than both the sealing ring and the elastic ring and located radially between the radially outwardly facing surface and the radially inwardly facing surface for preventing a direct radial pressing of the elastic ring on the sealing ring, wherein the support ring and the sealing ring include respective radially extending portions, wherein the radially extending portion of the support ring extends less far radially toward outside than the sealing ring, and the elastic ring comprises an axially extending annular sealing lip disposed radially outwardly of the radially extending portion of the support ring and bearing axially against the radially extending portion of the sealing ring.

* * * * *